United States Patent
Goupil et al.

(10) Patent No.: US 12,054,293 B2
(45) Date of Patent: Aug. 6, 2024

(54) SYSTEM AND METHOD FOR ASSISTING THE MAINTENANCE OF AN AIRCRAFT

(71) Applicant: Airbus Operations SAS, Toulouse (FR)

(72) Inventors: Philippe Goupil, Toulouse (FR);
Simone Urbano, Toulouse (FR);
Gabriel Derian, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 307 days.

(21) Appl. No.: 17/476,611

(22) Filed: Sep. 16, 2021

(65) Prior Publication Data
US 2022/0089297 A1 Mar. 24, 2022

(51) Int. Cl.
*B64F 5/60* (2017.01)
*B64D 43/00* (2006.01)

(52) U.S. Cl.
CPC ............. *B64F 5/60* (2017.01); *B64D 43/00* (2013.01)

(58) Field of Classification Search
CPC ......... B64C 13/503; B64D 43/00; B64F 5/60; G01M 5/0008; G01M 5/0016
See application file for complete search history.

(56) References Cited

U.S. PATENT DOCUMENTS

| | | | |
|---|---|---|---|
| 10,081,443 B2* | 9/2018 | Engel | G01M 5/0016 |
| 2003/0055601 A1* | 3/2003 | Miyamoto | G06F 30/23 702/182 |
| 2008/0215194 A1* | 9/2008 | Bailly | G05B 23/0283 701/3 |
| 2009/0273488 A1* | 11/2009 | Riser | B64C 27/001 340/963 |
| 2010/0010708 A1* | 1/2010 | Bailly | G05B 23/0235 701/33.4 |
| 2013/0197739 A1* | 8/2013 | Gallagher | B64F 5/60 701/31.5 |

(Continued)

FOREIGN PATENT DOCUMENTS

| | | | | |
|---|---|---|---|---|
| EP | 3756995 B1 * | 10/2023 | | B64C 13/00 |
| FR | 3074293 A | 5/2019 | | |

OTHER PUBLICATIONS

French Search Report; priority document.

*Primary Examiner* — Babar Sarwar
(74) *Attorney, Agent, or Firm* — Greer, Burns & Crain, Ltd.

(57) ABSTRACT

A system for assisting the maintenance of an aircraft is configured for implementing the following steps in an iterative manner determining a spectral power density of the position of a control surface over a time window; when the spectral power density corresponds to an amplitude of oscillations of the control surface upwardly crossing this predetermined threshold, storing an excess amplitude start time; and when the spectral power density corresponds to an amplitude of oscillations of the control surface downwardly crossing this predetermined threshold: determining a time interval between the excess amplitude start time and an excess amplitude end time, during which the amplitude of oscillations of the control surface has remained above the predetermined threshold; and determining an indicator representative of the energy corresponding to these oscillations during the time interval.

13 Claims, 5 Drawing Sheets

(56) References Cited

U.S. PATENT DOCUMENTS

| | | | |
|---|---|---|---|
| 2013/0327588 A1* | 12/2013 | Christenson | B64C 1/064 181/207 |
| 2016/0034611 A1* | 2/2016 | Landmann | G06F 30/15 703/2 |
| 2018/0079532 A1* | 3/2018 | Carini | G01M 5/0016 |
| 2020/0339286 A1* | 10/2020 | Al-Ameri | G01L 1/22 |
| 2020/0388090 A1* | 12/2020 | Glatfelter | G05B 23/0283 |

* cited by examiner

SYSTEM AND METHOD FOR ASSISTING THE MAINTENANCE OF AN AIRCRAFT

CROSS-REFERENCES TO RELATED APPLICATIONS

This application claims the benefit of the French patent application No. 2009555 filed on Sep. 21, 2020, the entire disclosures of which are incorporated herein by way of reference.

FIELD OF THE INVENTION

The invention relates to the field of assisting the maintenance of aircraft.

BACKGROUND OF THE INVENTION

Figure 1:
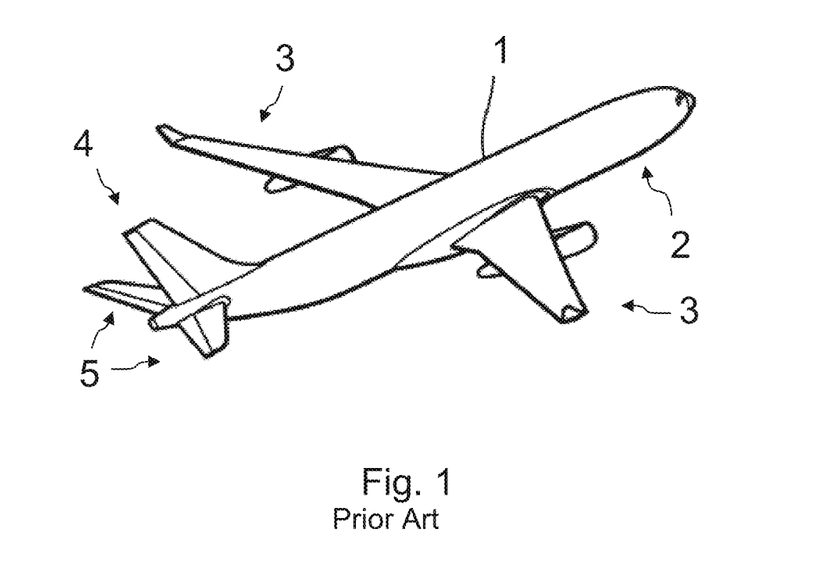
FIG. 1, already described, is a diagrammatic view of an aircraft.
Figure 2:
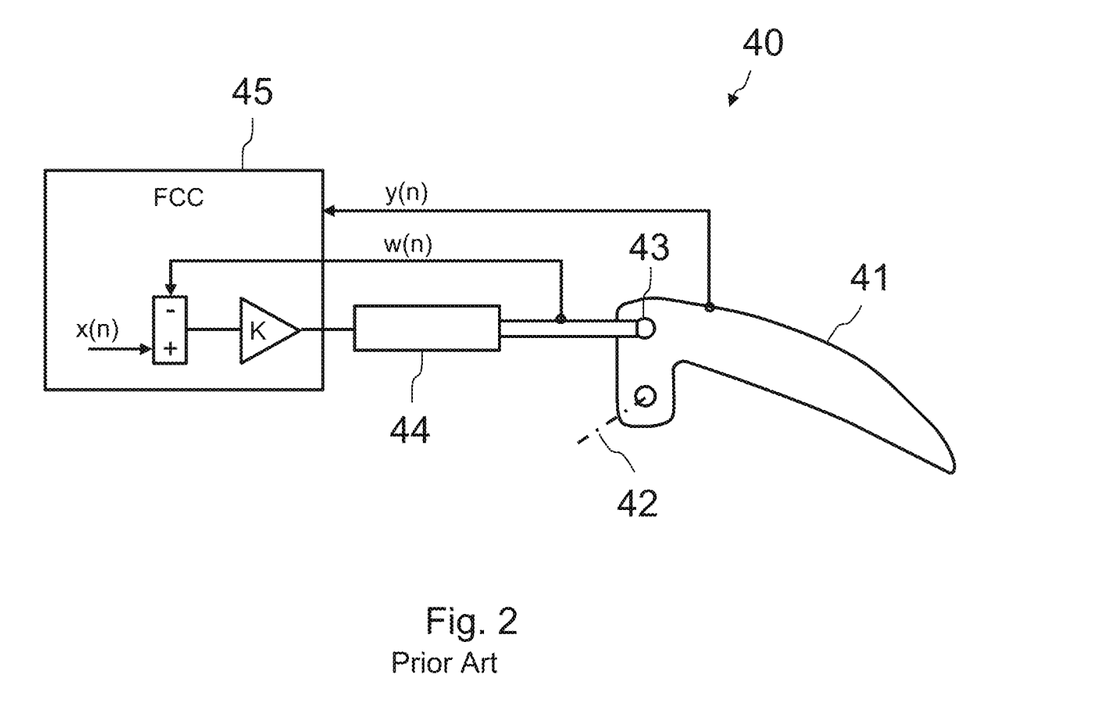
FIG. 2, already described is a diagrammatic illustration of a control system of a control surface of an aircraft according to the prior art.

As shown in FIG. 1, an aircraft 1, in particular a transport aircraft, generally comprises a fuselage 2 provided with wings 3, a vertical stabilizer 4 and horizontal stabilizers 5. The aircraft is also provided with a set of control surfaces, not shown in FIG. 1, corresponding, for example, to flaps or ailerons equipping the wings 3, to elevators associated with the horizontal stabilizers 5 or furthermore to a rudder associated with the vertical stabilizer 4. For example, for aircraft comprising electric flight controls, these control surfaces are controlled by a set of flight control computers of the aircraft. FIG. 2 shows a control system 40 for a control surface 41 of an aircraft such as the aircraft 1 shown in FIG. 1. The control surface 41 is mounted such that it is mobile in rotation about an axis 42 due to a hinge line comprising a set of ball joints making it possible to articulate the control surface with respect to a structural element of the aircraft. The system 40 comprises an actuator 44, for example a jack, of which the end of a rod is connected to the control surface 41 by a ball joint 43 in such a way as to make it possible to control a rotation of the control surface about the axis 42. The actuator 44 is controlled by a flight control computer 45 (named FCC in the figure, standing for "Flight Control Computer" in English). The control of the actuator 44 by the flight control computer 45 is, for example, a discretized control used iteratively at a predetermined sampling frequency. For a given iteration n, the flight control computer 45 determines a command x(n) which it applies to the actuator 44 via a control loop such as shown in the figure. This control loop comprises for example the return to the flight control computer of a measurement w(n) of the position of the rod of the actuator. It can also comprise the return to the flight control computer 45 of a measurement y(n) of the position of the control surface 41, expressed, for example, in the form of an angular position of the control surface about its axis of rotation 42.

Repeated maneuvers of the control surface while the aircraft is in use can give rise, in certain circumstances, to wear of the mechanical parts such as the ball joint 43 or furthermore the ball joints of the hinge line providing the connection between the control surface 41 and the axis of rotation 42. This results in mechanical plays, which can cause vibrations of the control surface 41 when the aircraft is in flight, notably when the control surface is lightly loaded aerodynamically. These vibrations can sometimes propagate to the structure of the aircraft and be felt by the passengers and by the crew of the aircraft. Consequently, it is desirable to identify a control surface at the source of vibrations with the intention of carrying out a maintenance of the control surface in order to guarantee the comfort of the passengers.

Now, given the high number of control surfaces of an aircraft, the identification of a control surface at the source of vibrations can prove to be difficult.

The patent application number FR3.074.293A1 lodged in the name of the applicant relates to a method and a device for detecting vibrations generated by a control surface. However, this method necessitates the use of numerous computations, which necessitates a high computing power. These computations can therefore be difficult to implement in some avionic computers, in particular, in some old-generation flight control computers. There is, therefore, a need to find a way of identifying vibrations of a control surface of an aircraft which necessitates fewer computations so that it can be implemented by the flight control computers of old-generation aircraft.

SUMMARY OF THE INVENTION

A purpose of the present invention is notably to provide a solution to this problem. It relates to a system for assisting the maintenance of an aircraft comprising a control surface likely to exhibit oscillations at an oscillation frequency of the control surface. The system comprises a processing unit configured for:
  implementing the following steps in an iterative manner, for position of the control surface measurements carried out at a predetermined sampling frequency:
  acquiring a position of the control surface measurement;
  determining a spectral power density of the position of the control surface over a time window corresponding to a set of position of the control surface measurements, for a predetermined frequency band including the oscillation frequency of the control surface;
  determining if the spectral power density corresponds to an amplitude of oscillations of the control surface higher than a predetermined threshold;
  when the spectral power density corresponds to an amplitude of oscillations of the control surface upwardly crossing this predetermined threshold, storing an excess amplitude start time; and
  when the spectral power density corresponds to an amplitude of oscillations of the control surface downwardly crossing this predetermined threshold;
  determining an excess amplitude end time;
  determining a time interval between the excess amplitude start time and the excess amplitude end time, during which the amplitude of oscillations of the control surface has remained above the predetermined threshold; and
  determining an indicator representative of the energy corresponding to these oscillations during the time interval,
  and for
  transmitting the indicator to an operator of the aircraft.

Thus, the maintenance assistance system makes it possible to calculate an indicator representative of the energy corresponding to these oscillation of the control surface without requiring a high computing power. This makes it possible to implement this system easily in an on-board computer of an aircraft, even if it is an old-generation flight control computer having low computing power.

According to different embodiments which can be taken in isolation or in combination:
  The processing unit is configured for determining a value corresponding to an amplitude of oscillations of the control surface corresponding to the determined spectral power density, and for comparing this value with a value corresponding to the predetermined threshold, in order to determine if the spectral power density corresponds to an amplitude of oscillations of the control surface higher than the predetermined threshold.

The value corresponding to the amplitude of oscillations of the control surface corresponding to the determined spectral power density, corresponds to the square of the amplitude of oscillations of the control surface. In particular, this value is determined by the formula:

$$A^2(n)=4\times M(n)/N$$

in which:

$A^2(n)$ is the square of the amplitude of oscillations of the control surface;

(M(n)) is the spectral power density; and

N is the number of sampling steps corresponding to the time window.

The processing unit is configured for determining the spectral power density of the position of the control surface using a so-called Goertzel algorithm for calculating a Fourier transform of the position of the control surface.

The processing unit is configured for determining the spectral power density of the position of the control surface as corresponding to the maximum value of at least three spectral power densities determined for the oscillation frequency of the control surface, for the lower limit of the predetermined frequency band and for the upper limit of the predetermined frequency band respectively.

The processing unit is configured for correcting the value of the time interval as a function of a value corresponding to the amplitude of the oscillations of the control surface.

The processing unit is configured in such a way that when several separate time intervals of oscillations of the control surface are determined during a same flight of the aircraft, the processing unit determines the indicator as being representative of the sum of the energy corresponding to these oscillations during all of the time intervals.

The processing unit is configured for inhibiting the detection of oscillations of the control surface or the taking into account of the detection when at least one of the following conditions is met:

the time interval is less than a predetermined duration;

the position of the control surface measurement corresponds to a deflection of the control surface greater in absolute value than a predetermined angular value;

a current command of the control surface corresponds to an angular velocity of the control surface greater in absolute value than a predetermined angular velocity value.

The processing unit is part of an on-board avionic computer of the aircraft, in particular a flight control computer, and the processing unit is configured for implementing the various steps in real time.

The processing unit is part of a computer outside of the aircraft, in particular a computer of an operational center of an airline company operating the aircraft, this computer being configured for receiving flight data of the aircraft comprising at least a set of position of the control surface measurements carried out at the predetermined sampling frequency.

The invention also relates to a method for assisting the maintenance of an aircraft comprising a control surface likely to exhibit oscillations at an oscillation frequency of the control surface. The method comprises the following steps implemented by a processing unit:

the following set of steps implemented in an iterative manner, for position of the control surface measurements carried out at a predetermined frequency:

acquiring a position of the control surface measurement;

determining a spectral power density of the position of the control surface over a time window corresponding to a set of position of the control surface measurements, for a predetermined frequency band including the oscillation frequency of the control surface;

determining if the spectral power density corresponds to an amplitude of oscillations of the control surface higher than a predetermined threshold;

when the spectral power density corresponds to an amplitude of oscillations of the control surface upwardly crossing this predetermined threshold, storing an excess amplitude start time; and when the spectral power density corresponds to an amplitude of oscillations of the control surface downwardly crossing this predetermined threshold:

determining an excess amplitude end time;

determining a time interval between the excess amplitude start time and the excess amplitude end time, during which the amplitude of oscillations of the control surface has remained above the predetermined threshold; and determining an indicator representative of the energy corresponding to these oscillations during the time interval, and a step of transmitting the indicator to an operator of the aircraft.

The invention also relates to an aircraft comprising a system such as mentioned above.

BRIEF DESCRIPTION OF THE DRAWINGS

The invention will be better understood on reading the following description and on examination of the appended figures.

DETAILED DESCRIPTION OF THE PREFERRED EMBODIMENTS

Figure 3:
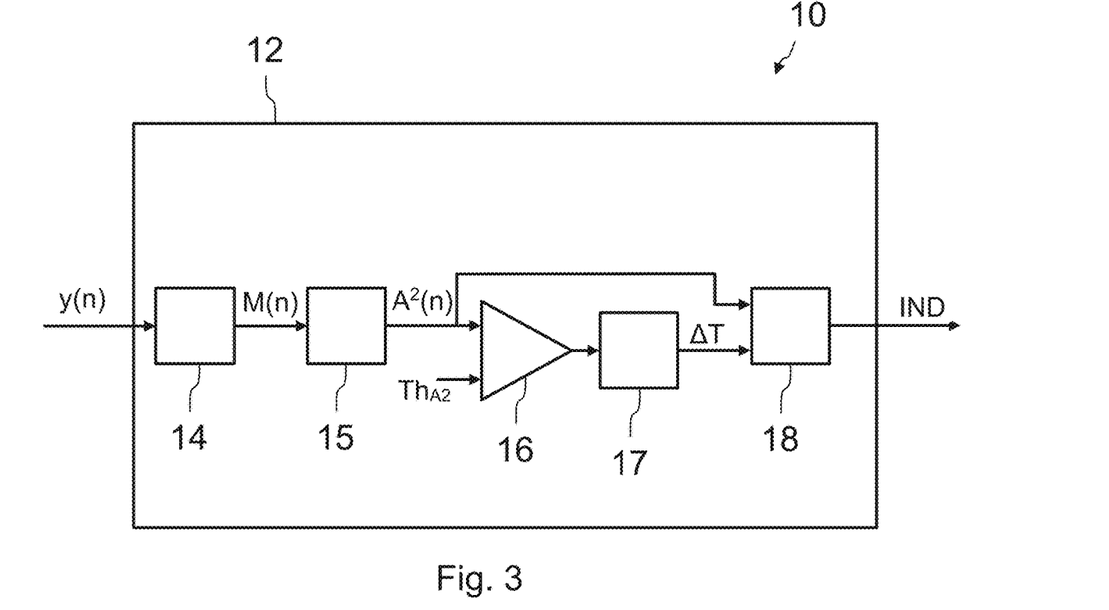
FIG. 3 is a block diagram of a system for assisting the maintenance of an aircraft according to an embodiment of the invention.

The system 10 for assisting the maintenance of an aircraft shown in FIG. 3 comprises a processing unit 12. This processing unit comprises, for example, a microprocessor or a microcontroller. It comprises a first module 14 configured for receiving on its input values of position measurements of a control surface of the aircraft, for determining a spectral power density of the position of the control surface and for providing on its output the spectral power density of the position of the control surface. The processing unit 12 also comprises a second module 15 configured for receiving on its input the spectral power density of the position of the control surface coming from the first module 14, for determining a value corresponding to an amplitude of oscillations of the control surface and for providing on its output the value corresponding to an amplitude of oscillations of the control surface. The processing unit 12 also comprises a third module 16 corresponding to a comparator configured for receiving on a first input the value corresponding to an amplitude of oscillations of the control surface coming from the second module 15 and for comparing the value with a predetermined threshold corresponding to a minimum amplitude of oscillations that it is desired to detect. The processing unit 12 comprises moreover a fourth module 17 configured for receiving on its input an output of the comparator 16, for determining a value ΔT of a time interval during which the value corresponding to an amplitude of oscillations of the control surface is higher than the predetermined threshold and for providing the time interval value on its output. The processing unit 12 also comprises a fifth module 18 configured for receiving on its input, on the one hand, the time interval value coming from the fourth module 17 and, on the other hand, a value corresponding to an amplitude of oscillations of the control surface, for determining an indicator representative of the energy corresponding to these oscillations during the time interval and for providing the indicator on its output. The first module 14, the second module 15, the third module 16, the fourth module 17 and the fifth module 18 correspond for example to software modules or to parts of a software product used by the processing unit 12.

When operating, the various computations carried out by the processing unit are implemented in an iterative manner, the position of the control surface measurements received by the first module 14 corresponding to a sampling of the position of the control surface at a predetermined sampling frequency. Thus, for an iteration number n, the first module 14 receives on its input a measurement y(n) of the position of the control surface corresponding to that iteration. Similarly, at the next iteration n+1, the first module 14 receives on its input a measurement y(n+1) of the position of the control surface and so on. At iteration n, the first module 14 determines the spectral power density M(n) of the position of the control surface. The spectral power density is determined over a sliding time window corresponding a number N of sampling steps. Thus, at iteration n, this time window corresponds to the measurements received at iterations n−N to n. Consequently, the first module 14 determines the spectral power density M(n) from a set of position of the control surface measurements y(n−N) to y(n) corresponding to this time window. The first module 14 determines the spectral power density M(n) for a predetermined frequency band including a frequency f0 of oscillation of the control surface. This frequency band is, for example, a frequency band [f0−δf; f0+δf] centered on the frequency f0 of oscillation of the control surface, δf corresponding to the half-width of the frequency band. The frequency f0 of oscillation of the control surface as well as the width of the frequency band are, for example, a function of the geometry and of the structure of the aircraft (natural modes of the structure).

As a function of the spectral power density M(n) determined by the first module 14, the second module 15 determines a value corresponding to an amplitude of oscillations of the control surface. This value is for example determined on the basis of the following equation (at iteration n):

$$M(n)=A^2(n)/4\times N$$

in which:

M(n) is the spectral power density determined by the first module 14;

$A^2(n)$ is the square of the amplitude of oscillation A(n) of the control surface; and N is the number of sampling steps corresponding to the time window over which the first module 14 has determined the spectral power density M(n).

The value corresponding to an amplitude of oscillations of the control surface, determined by the second module 15, can correspond to the amplitude of oscillation of the control surface. However, advantageously, this value corresponds to the square of the amplitude of oscillations of the control surface. Thus, on the basis of the equation mentioned above, this value can be calculated according to the following equation, without necessitating the calculation of a square root (which would require more power from the processing unit 12):

$$A^2(n)=4\times M(n)/N$$

The comparator 16 compares this value with a predetermined threshold $Th_{A2}$. This threshold is chosen such that it corresponds with a minimum amplitude of oscillations of the control surface that it is desired to detect, for example a minimum amplitude of oscillations of the control surface likely to generate vibrations of the control surface. When the value corresponding to an amplitude of oscillations of the control surface, determined by the second module 15, corresponds to the square of the amplitude of oscillations the control surface, this threshold is equal to the square of the minimum amplitude that it is desired to detect. In the rest of the description, when the value corresponding to an amplitude of oscillations of the control surface, determined by the second module 15, is higher than the predetermined threshold, the output of the comparator 16 is said to be active. Otherwise, this output is said to be inactive.

When the output of the comparator 16 is active, the fourth module 17 checks if an excess amplitude indicator is in an inactive state. If such is the case, the fourth module 17 then stores an excess amplitude start time and it sets the excess amplitude indicator to the active state. The storing of the excess amplitude start time can, for example, correspond to a storage of the number n of the current iteration. Previously, during the initialization of the system 10 for assisting the maintenance of the aircraft, the excess amplitude indicator was initialized in the inactive state.

When the output of the comparator 16 is inactive, the fourth module 17 checks if the excess amplitude indicator is in an active state. If such is the case, the fourth module 17 then stores an excess amplitude end time and it sets the excess amplitude indicator to the inactive state. The storing of the excess amplitude end time can, for example, correspond to a storage of the number of the current iteration. The fourth module 17 then determines a time interval ΔT between the excess amplitude start time and the excess amplitude end time, during which the amplitude of oscillations of the control surface has remained above the predetermined threshold. When the storing of the excess amplitude start and end times corresponds to a storage of the current iteration numbers at the times, the time interval ΔT is equal to the product of the difference between the current iteration numbers and the duration of a sampling step.

When the fifth module 18 receives, from the fourth module 17, a time interval value corresponding to an excess amplitude of oscillations of the control surface, the fifth module determines an indicator IND representative of the energy corresponding to these oscillations during the time interval. This indicator corresponds, for example, to the integral with respect to time, over the time interval ΔT, of the square of the amplitude of the oscillations of the control surface:

$$IND = \int_{\Delta T} A^2 dt$$

When a phenomenon of oscillations of the control surface occurs, the amplitude of the oscillations of the control surface is generally constant during the time interval ΔT corresponding to these oscillations. Now, given that the second module 15 determines the value corresponding to the amplitude of the oscillations of the control surface as a function of the spectral power density, determined over a sliding time window, this value can be less than the real amplitude of the oscillations, in particular, at the start and at the end of the time interval. However, over the rest of the time interval, this value corresponds well to the real amplitude of the oscillations. Consequently, and advantageously, the value of the square of the amplitude used by the fifth module 18 for the determination of the indicator IND is chosen to be constant and equal to the maximum value $A^2 MAX$ of the square of the amplitude determined by the second module 15 over the time interval ΔT. The indicator IND is therefore calculated according to the following equation:

$$IND = A^2 MAX \times \Delta T$$

The maintenance assistance system 10 transmits the indicator IND to a maintenance operator of the aircraft. This transmission can correspond to a display of the value of the indicator IND on a display screen, either automatically or when requested by the maintenance operator. It can also correspond to the transmission of the indicator IND to another computer from which the maintenance operator can access the value of the indicator IND.

When oscillations of the control surface are detected during several time intervals during a flight of the aircraft, the indicator IND determined by the fifth module 18 is preferably representative of the sum of the energy corresponding to the oscillations during all of the time intervals. For example, if oscillations of the control surface are detected during 3 time intervals ΔT1, ΔT2 and ΔT3 during a flight of the aircraft, having respective maximum values $A^2 MAX1$, $A^2 MAX2$, $A^2 MAX3$ of the square of the amplitude of the oscillations, the indicator IND is then equal to:

$$IND = A^2 MAX1 \times \Delta T1 + A^2 MAX2 \times \Delta T2 + A^2 MAX3 \times \Delta T3$$

In a first embodiment, the processing unit 12 is part of an on-board avionic computer of the aircraft, in particular, a flight control computer. The positions of the control surface values y(n) are then used in real time by the first module 14 for determining the spectral power density. The second to fifth modules 15 to 18 also carry out their various computations in real time. The processing unit can thus provide the indicator IND at the end of a flight of the aircraft. According to a first alternative, the indicator IND is available for a maintenance operator on board the aircraft, for example via a centralized maintenance system of the aircraft to which the flight control computer transmits this indicator. According to a second alternative, the flight control computer transmits the indicator IND to an operational center of the airline company operating the aircraft, for example via a wireless data communication link after the aircraft has landed.

In a second embodiment, the processing unit 12 is part of a computer outside of the aircraft, in particular, a computer of an operational center of an airline company operating the aircraft. This computer is configured for receiving flight data from the aircraft comprising at least a set of position of the control surface measurements carried out at the predetermined sampling frequency. These flight data are for example acquired by a system of the ACMS (standing for "Aircraft Condition Monitoring System" in English) type of the aircraft and transmitted to the operational center by a data communication link. The processing unit 12 can then compute the indicator IND at any time after the flight of the aircraft, starting from the time when the data are available to it. A maintenance operator can then consult the indicator IND.

In an advantageous embodiment, the first module 14 uses a so-called Goertzel algorithm for calculating a Fourier transform required for the determination of the spectral power density M(n). This algorithm has the advantage of necessitating only a few computing resources, which is particularly advantageous in combination with the first embodiment when the processing unit 12 is part of a flight control computer on board the aircraft. In fact, certain flight control computers, in particular those of old-generation aircraft, have rather limited computing resources. The use of such an algorithm thus makes it possible to implement the invention even by means of such flight control computers.

Figure 4:
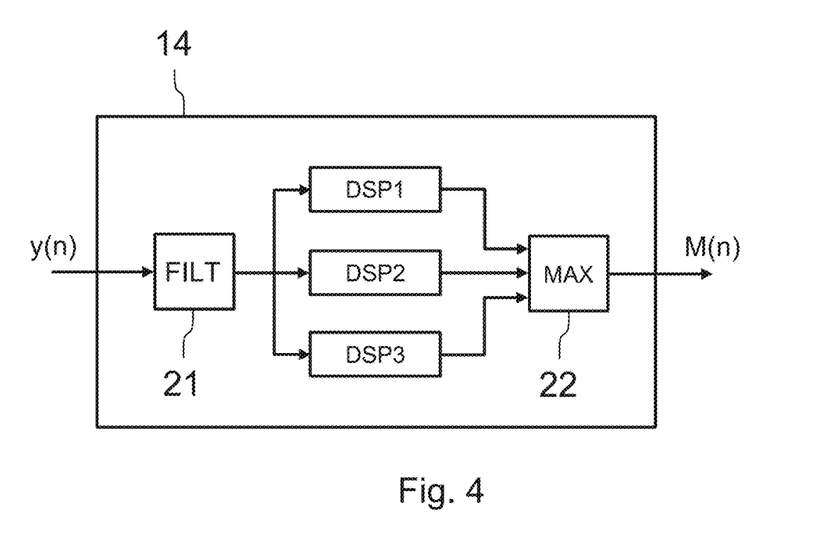
FIG. 4 is a block diagram of a particular embodiment of a spectral power density computing module of the system for assisting the maintenance of an aircraft shown in FIG. 3.

In an embodiment shown in FIG. 4, the first module 14 is configured for determining the spectral power density M(n) of the position of the control surface as corresponding to the maximum value of at least three spectral power densities respectively determined for the frequency f0 of oscillation of the control surface, for the lower limit f0-δf of the predetermined frequency band and for the upper limit f0+δf of the predetermined frequency band. For this purpose, the first module 14 comprises three sub-modules, named DSP1, DSP2 and DSP3 in the figure, each one dedicated to the determination of a spectral density of the position of the control surface, for the frequencies f0-δf, f0 and f0+δf respectively. Without leaving the context of the invention, these three sub-modules can correspond to three instances of the same sub-module for determining spectral power density. A sub-module 22, named MAX in the figure, determines the maximum value M(n) of the three spectral power densities determined by the 3 sub-modules DSP1, DSP2 and DSP3. The fact of determining these three spectral power densities for these three frequencies is less costly in terms of required computing power than computing a spectral power density over the whole of the frequency band. Advantageously, although not obligatorily, the first sub-module 14 comprises moreover a filter 21, named FILT in figure. This filter is a bandpass filter configured for filtering the position of the control surface measurements y(n) in order to retain only the frequency band [f0-δf; f0+δf]. This makes it possible to facilitate the computations of spectral power density by the three sub-modules DSP1, DSP2 and DSP3 for the abovementioned three frequencies. This embodiment can advantageously be combined with the embodiment described previously which uses a so-called Goertzel algorithm. In fact, the combination of the two embodiments makes it possible to determine the spectral power density over the whole of the frequency band [f0-δf; f0+δf] while requiring only three computations of spectral power density that are inexpensive in terms of computing resources because of the use of the algorithm. In a particular embodiment, the frequency f0 of oscillation of the control surface is equal to 10 Hz and the half-width δf of the frequency band is equal to 0.5 Hz. Consequently, f0−δf is equal to 9.5 Hz and f0+δf is equal to 10.5 Hz.

Figure 5A:
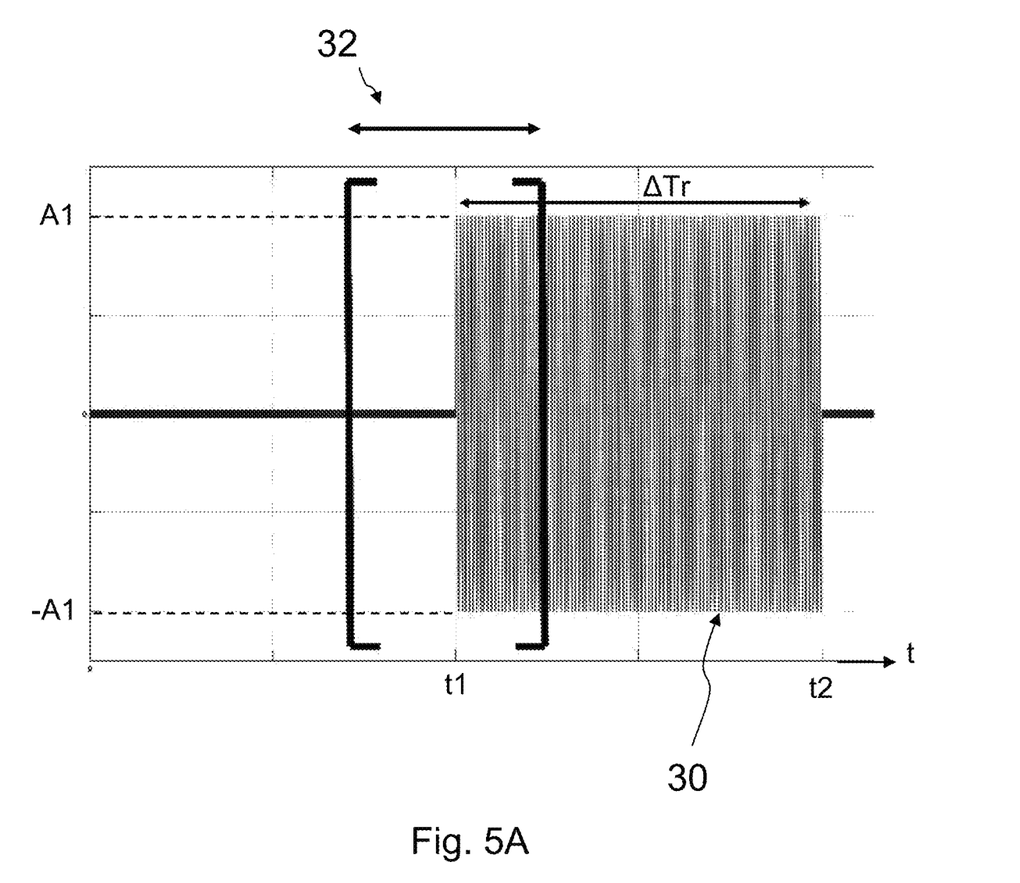
FIG. 5A shows oscillations of a control surface of an aircraft corresponding to a first amplitude value of the oscillations.
Figure 5B:
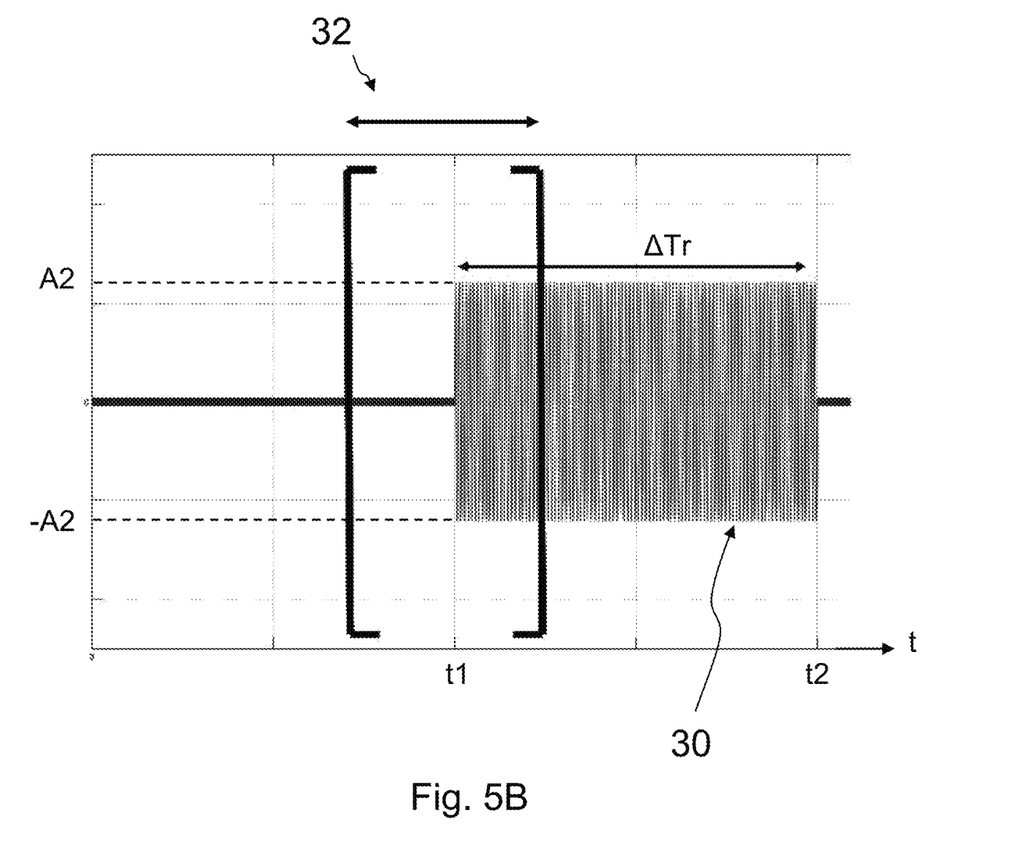
FIG. 5B shows oscillations of a control surface of an aircraft corresponding to a second amplitude value of the oscillations, lower than the first amplitude value.
Figure 6:
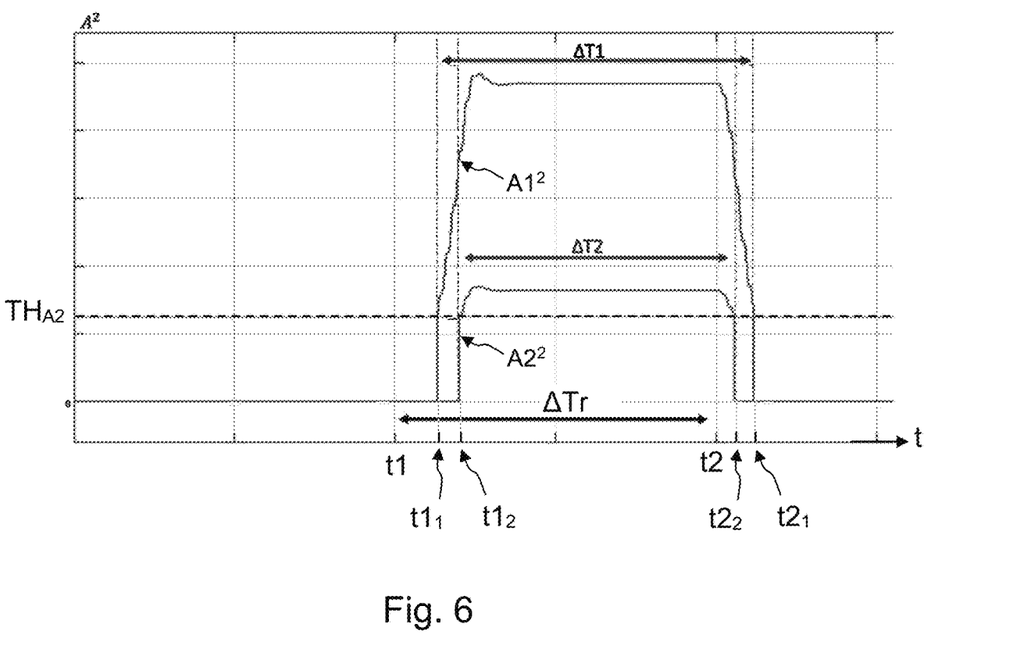
FIG. 6 illustrates the detection of the oscillations corresponding to FIGS. 5A and 5B, by a system for assisting maintenance according to an embodiment of the invention.

According to the invention, the first module 14 determines the spectral power density M(n) over a sliding time window 32 as shown in FIGS. 5A and 5B. During the occurrence of oscillations 30 of the control surface, the measurements y(n−N) . . . y(n) in question in this time window correspond, for an oldest section, to a substantially zero value and, for the most recent section, to a value corresponding to the oscillations of the control surface. Consequently, during the appearance of oscillations, the value of the spectral power density increases as time progresses (as the different sampling steps take place), until all of the measurements present in the window correspond to oscillations of the control surface. Given that the second module 15 determines the value $A^2(n)$ corresponding to an amplitude of oscillations of the control surface as a function of the spectral power density M(n) determined by the first module 14, this value $A^2(n)$ corresponding to an amplitude of oscillations of the control surface also increases as time progresses (as the different sampling steps take place) until all of the measurements present in the time window correspond to oscillations of the control surface. This results in a delay between the real appearance of the oscillations and a time at which these oscillations are detected by the comparator 16, by comparison between the value $A^2(n)$ and the threshold $TH_{A2}$. This delay becomes greater as the amplitude of the oscillations become smaller (and therefore as the value $A^2(n)$ becomes smaller). This phenomenon is shown in FIG. 6 for oscillations of a control surface similar over time, respectively corresponding to an amplitude A1 and to an amplitude A2 (smaller than A1) such as shown in FIGS. 5A and 5B respectively. These oscillations, which correspond to a real time interval ΔTr, begin at a time t1 and stop and a time t2. The oscillations of amplitude A1 shown in FIG. 5A are detected by the comparator 16 at a time t11 later than t1, when the value A1² determined par the second module 15 goes above the threshold $TH_{A2}$. The oscillations of amplitude A2 shown in FIG. 5B are detected by the comparator 16 at a time t12 later than t1, when the value A2² determined by the second module 15 goes above the threshold $TH_{A2}$. The amplitude A2 being lower than the amplitude A1, the time t12 is later than the time t11. A similar phenomenon occurs when the oscillations of the control surface stop. This results in an error in the time interval ΔT determined by the fourth module 17 between the excess amplitude start time and the excess amplitude end time. Thus, in the example shown in FIG. 6, the stopping of the oscillations of amplitude A1 is detected by the comparator 16 at a time t21 later than t2, when the value A1² determined by the second module 15 falls below the threshold $TH_{A2}$ Similarly, the stopping of the oscillations of amplitude A2 is detected by the comparator 16 at a time t22 later than t2, when the value A2² determined by the second module 15 falls below the threshold $TH_{A2}$. The amplitude A2 being lower than the amplitude A1, the time t22 is earlier than the time t21. Thus, the time interval ΔT2 determined by the fourth module 17 has a duration shorter than the duration of the real time interval ΔTr during which the oscillations of the control surface have taken place. Moreover, since t12 is later than t11 and t22 is earlier than t21, ΔT2 is shorter than ΔT1. Despite this phenomenon, the maintenance assistance system according to the invention makes it possible to determine a reliable indicator IND on the basis of which a maintenance operator can identify a control surface exhibiting plays and having to be the subject of a maintenance operation. However, advantageously, the fourth module 17 is configured for correcting the value of the time interval ΔT determined as described previously, as a function of a value corresponding to the amplitude of the oscillations of the control surface, for example as a function of the maximum value $A^2MAX$ of the square of the amplitude over the time interval ΔT. The value of the correction used by the fourth module 17 is, for example, determined by using a correspondence table giving the correction value of the correction as a function of the square of the amplitude of the oscillations of the control surface. In a particular embodiment, this correspondence table is established on the basis of simulations making it possible to determine the error over the time interval ΔT as a function of the amplitude of the oscillations of the control surface.

Also advantageously, the fourth module 17 is configured for inhibiting the taking into account of the detection of oscillations of the control surface when the time interval ΔT is shorter than a predetermined duration. This makes it possible to avoid detecting oscillatory phenomena that are too short to correspond to oscillations of the control surface resulting from the aforesaid plays.

In a particular embodiment, the processing unit 12 is configured for inhibiting the detection of oscillations of the control surface when the position measurement y(n) of the control surface corresponds to a deflection of the control surface greater in absolute value than a predetermined angular value. In fact, the oscillations of the control surface related to the plays as mentioned above generally appear only when the control surface is in a position that is not deflected or slightly deflected. The inhibiting of the detection of oscillations of the control surface when the deflection of the control surface is greater in absolute value than a predetermined angular value makes it possible to avoid the detection of oscillations which would not have such plays as their source.

In another particular embodiment, the processing unit 12 is configured for inhibiting the detection of oscillations of the control surface when a current command x(n) of the control surface corresponds to an angular velocity of the control surface greater in absolute value than a predetermined value of angular velocity. This makes it possible to avoid detecting oscillations of the control surface which would be due to fast movements of the control surface rather than to plays such as mentioned above.

Although the above description relates to the determination of an indicator representative of the energy corresponding to oscillations of a control surface of the aircraft, in practice it is advantageous to determine such an indicator for each one of the control surfaces of the aircraft, or at least for the control surfaces most exposed to a risk of wear at the source of plays likely to generate vibrations. Thus, these indicators make it possible for a maintenance operator to easily determine which control surface or control surfaces is or are at the source of vibrations felt by the crew and/or by the passengers of the aircraft.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for assisting a maintenance of an aircraft comprising a control surface likely to exhibit oscillations at an oscillation frequency of the control surface, wherein the system comprises a processing unit configured to:
   implement the following steps in an iterative manner, for position of control surface measurements carried out at a predetermined sampling frequency:
      acquiring a position of the control surface measurement;
      determining a spectral power density of the position of the control surface over a time window corresponding to a set of positions of the control surface measurements, for a predetermined frequency band including the oscillation frequency of the control surface;
      determining if the spectral power density corresponds to an amplitude of oscillations of the control surface higher than a predetermined threshold;
      when the spectral power density corresponds to an amplitude of oscillations of the control surface upwardly crossing this predetermined threshold, storing an excess amplitude start time; and
      when the spectral power density corresponds to an amplitude of oscillations of the control surface downwardly crossing this predetermined threshold, determining an excess amplitude end time;
      determining a time interval between the excess amplitude start time and the excess amplitude end time, during which the amplitude of oscillations of the control surface has remained above the predetermined threshold; and
      determining an indicator representative of energy corresponding to these oscillations during the time interval, and for
   transmitting said indicator to an operator of the aircraft, and
   wherein the processing unit is further configured to determine a value corresponding to an amplitude of oscillations of the control surface corresponding to a determined spectral power density, and for comparing this value with a value corresponding to the predetermined threshold, in order to determine if the spectral power density corresponds to an amplitude of oscillations of the control surface higher than the predetermined threshold, and
   wherein the value corresponding to the amplitude of oscillations of the control surface corresponding to the determined spectral power density, corresponds to the square of said amplitude of oscillations of the control surface, this value being determined by a formula comprising:

$$A^2(n) = 4 \times M(n)/N$$

in which:
   $A^2(n)$ is the square of the amplitude of oscillations of the control surface;
   $(M(n))$ is the spectral power density; and
   N is the number of sampling steps corresponding to the time window.

2. The system according to claim 1, wherein the processing unit is configured to determine the spectral power density of the position of the control surface using a so-called Goertzel algorithm for calculating a Fourier transform of the position of the control surface.

3. The system according to claim 1, wherein the processing unit is configured to determine the spectral power density of the position of the control surface as corresponding to a maximum value of at least three spectral power densities determined for said oscillation frequency of the control surface, for a lower limit of the predetermined frequency band and for an upper limit of the predetermined frequency band, respectively.

4. The system according to claim 1, wherein the processing unit is configured to correct a value of said time interval as a function of a value corresponding to an amplitude of the oscillations of the control surface.

5. The system according to claim 1, wherein the processing unit is configured such that when several separate time intervals of oscillations of the control surface are determined during a same flight of the aircraft, the processing unit determines said indicator as being representative of a sum of the energy corresponding to these oscillations during all of said time intervals.

6. The system according to claim 1, wherein the processing unit is configured to inhibit a detection of oscillations of the control surface or the taking into account of said detection when at least one of the following conditions is met:
   said time interval is less than a predetermined duration;
   the position of the control surface measurement corresponds to a deflection of the control surface greater in absolute value than a predetermined angular value;
   a current command of the control surface corresponds to an angular velocity of the control surface greater in absolute value than a predetermined angular velocity value.

7. The system according to claim 1, wherein the processing unit is part of an on-board avionic computer of the aircraft and the processing unit is configured for implementing the various steps in real time.

8. The system according to claim 7, wherein the on-board avionic computer comprises a flight control computer.

9. The system according to claim 1, wherein the processing unit is part of a computer outside of the aircraft, this computer being configured to receive flight data of the aircraft comprising at least a set of positions of the control surface measurements carried out at said predetermined sampling frequency.

10. The system according to claim 9, wherein the computer outside of the aircraft comprises a computer of an operational center of an airline company operating the aircraft.

11. An aircraft comprising a system for assisting maintenance according to claim 1.

12. A method for assisting a maintenance of an aircraft comprising a control surface likely to exhibit oscillations at an oscillation frequency of said control surface, wherein the method comprises the following steps implemented by a processing unit:
   the following set of steps implemented in an iterative manner, for position of control surface measurements carried out at a predetermined sampling frequency:
      acquiring a position of the control surface measurement;
      determining a spectral power density of the position of the control surface over a time window corresponding to a set of position of the control surface measurements, for a predetermined frequency band including said oscillation frequency of the control surface;

determining if the spectral power density corresponds to an amplitude of oscillations of the control surface higher than a predetermined threshold;

when the spectral power density corresponds to an amplitude of oscillations of the control surface upwardly crossing this predetermined threshold, storing an excess amplitude start time; and when the spectral power density corresponds to an amplitude of oscillations of the control surface downwardly crossing this predetermined threshold:

determining an excess amplitude end time;

determining a time interval between the excess amplitude start time and the excess amplitude end time, during which the amplitude of oscillations of the control surface has remained above the predetermined threshold; and determining an indicator representative of energy corresponding to these oscillations during said time interval, and a step of transmitting said indicator to an operator of the aircraft, and wherein the processing unit is configured to determine a value corresponding to an amplitude of oscillations of the control surface corresponding to a determined spectral power density, and for comparing this value with a value corresponding to the predetermined threshold, in order to determine if the spectral power density corresponds to an amplitude of oscillations of the control surface higher than the predetermined threshold, and wherein the value corresponding to the amplitude of oscillations of the control surface corresponding to the determined spectral power density, corresponds to the square of said amplitude of oscillations of the control surface, this value being determined by a formula comprising:

$$A^2(n) = 4 \times M(n)/N$$

in which:

$A^2(n)$ is the square of the amplitude of oscillations of the control surface;

$(M(n))$ is the spectral power density; and

N is the number of sampling steps corresponding to the time window.

13. A system for assisting a maintenance of an aircraft comprising a control surface likely to exhibit oscillations at an oscillation frequency of the control surface, wherein the system comprises a processing unit configured to:

implement the following steps in an iterative manner, for position of control surface measurements carried out at a predetermined sampling frequency:

acquiring a position of the control surface measurement;

determining a spectral power density of the position of the control surface over a time window corresponding to a set of positions of the control surface measurements, for a predetermined frequency band including the oscillation frequency of the control surface;

determining if the spectral power density corresponds to an amplitude of oscillations of the control surface higher than a predetermined threshold;

when the spectral power density corresponds to an amplitude of oscillations of the control surface upwardly crossing this predetermined threshold, storing an excess amplitude start time; and when the spectral power density corresponds to an amplitude of oscillations of the control surface downwardly crossing this predetermined threshold;

determining an excess amplitude end time;

determining a time interval between the excess amplitude start time and the excess amplitude end time, during which the amplitude of oscillations of the control surface has remained above the predetermined threshold; and determining an indicator representative of energy corresponding to these oscillations during the time interval, and for transmitting said indicator to an operator of the aircraft, and, wherein the processing unit is further configured to inhibit a detection of oscillations of the control surface or the taking into account of said detection when at least one of the following conditions is met:

said time interval is less than a predetermined duration;

the position of the control surface measurement corresponds to a deflection of the control surface greater in absolute value than a predetermined angular value;

a current command of the control surface corresponds to an angular velocity of the control surface greater in absolute value than a predetermined angular velocity value.

* * * * *